Aug. 3, 1926.
J. B. PROTHRO
1,595,024
LOCOMOTIVE DRIFTING VALVE
Filed June 27, 1924 5 Sheets-Sheet 1
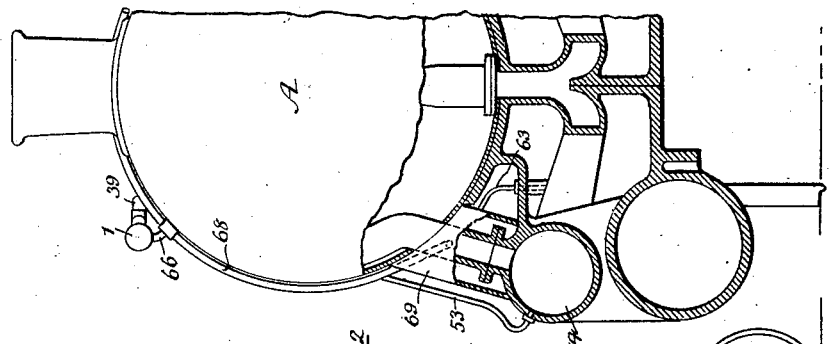
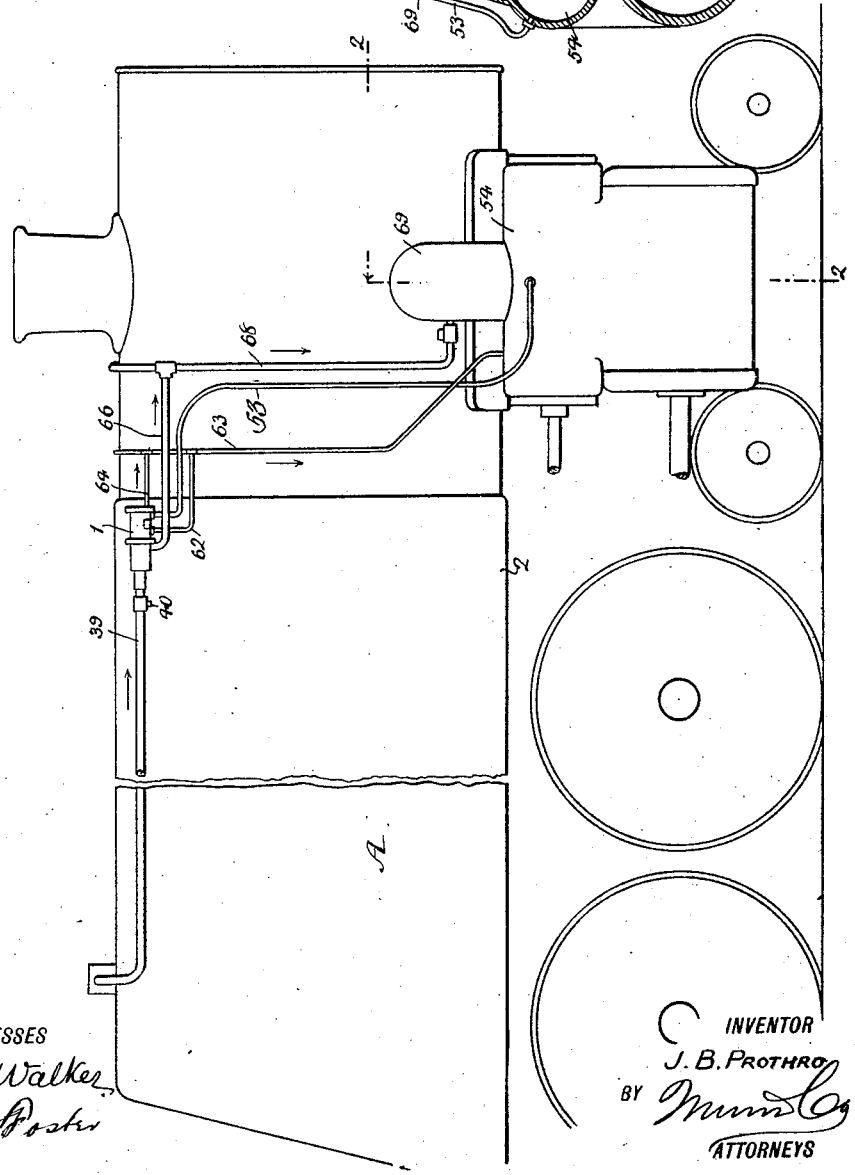
WITNESSES
INVENTOR
J. B. Prothro
BY
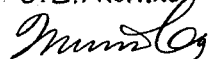
ATTORNEYS

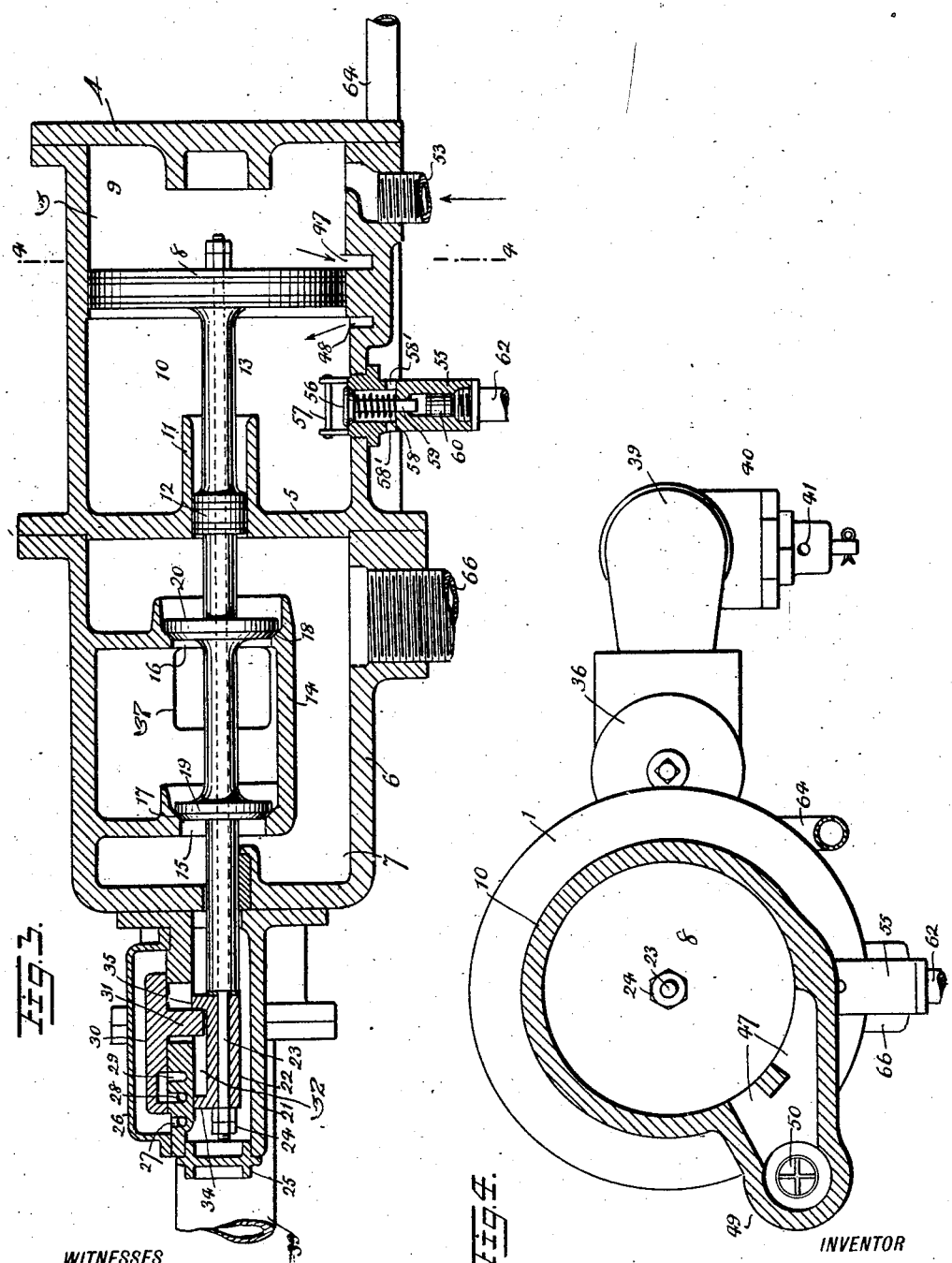

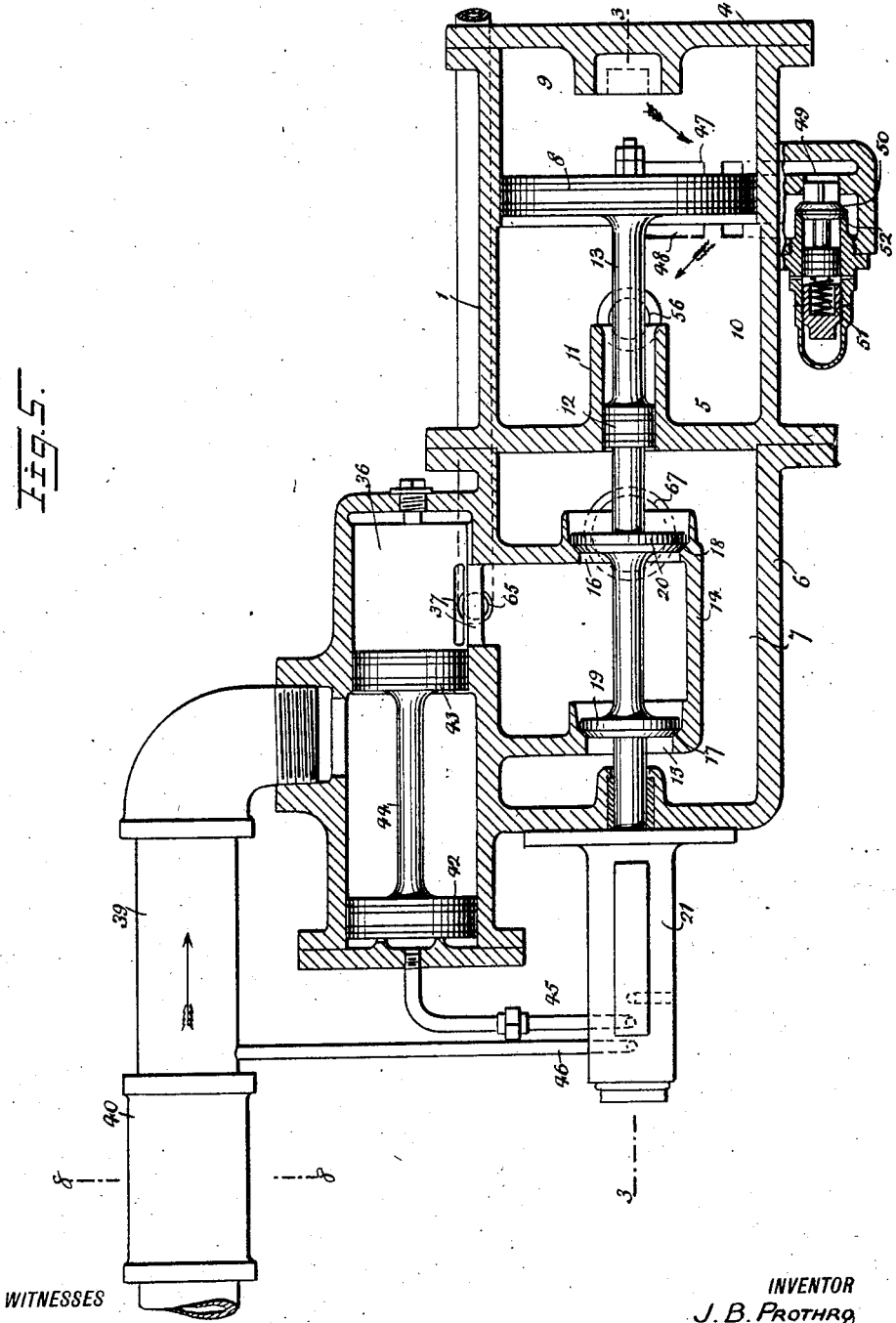

Aug. 3, 1926.
J. B. PROTHRO
1,595,024
LOCOMOTIVE DRIFTING VALVE
Filed June 27, 1924   5 Sheets-Sheet 4
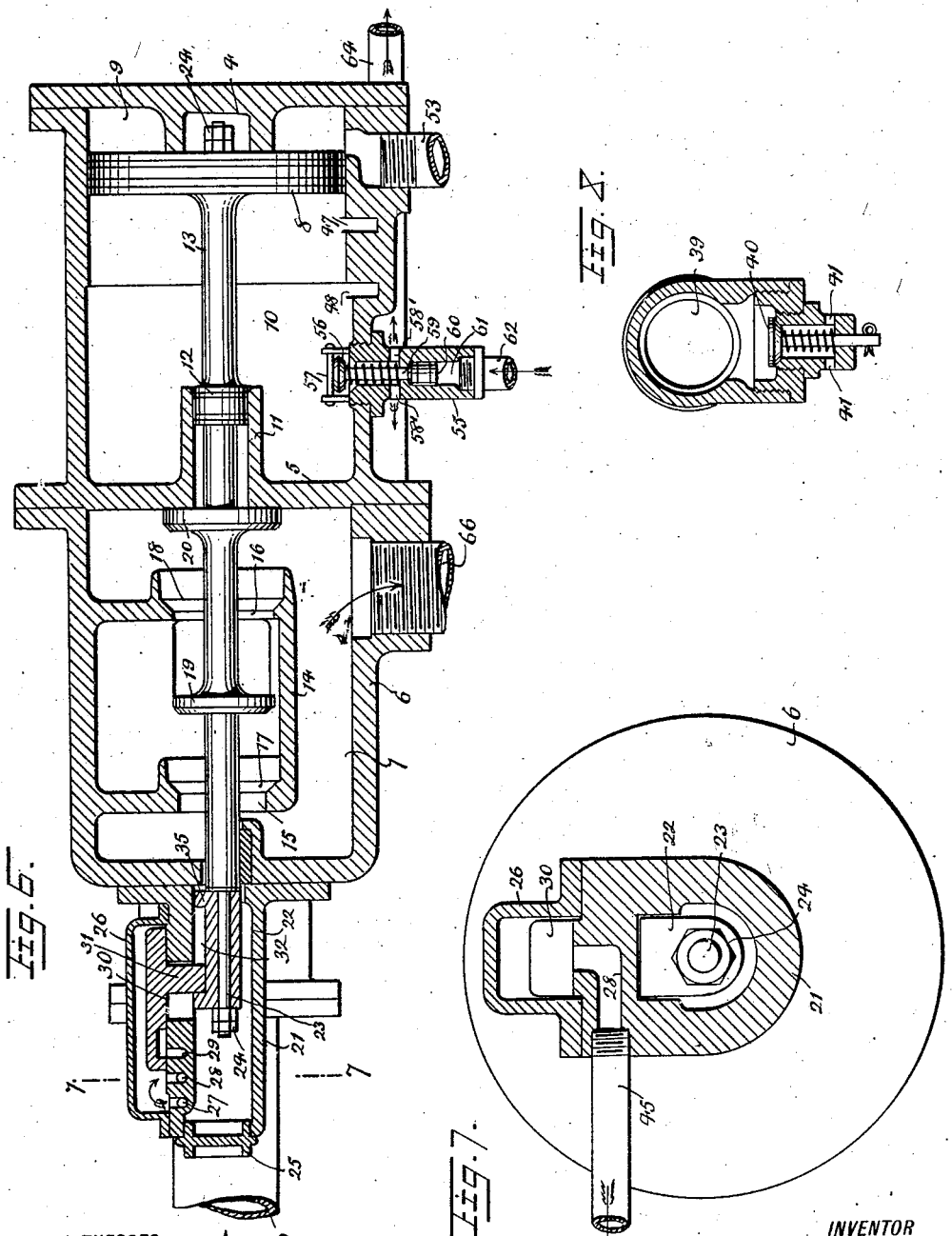
WITNESSES
H. J. Walker
A. W. Booker
INVENTOR
J. B. PROTHRO
BY
ATTORNEYS

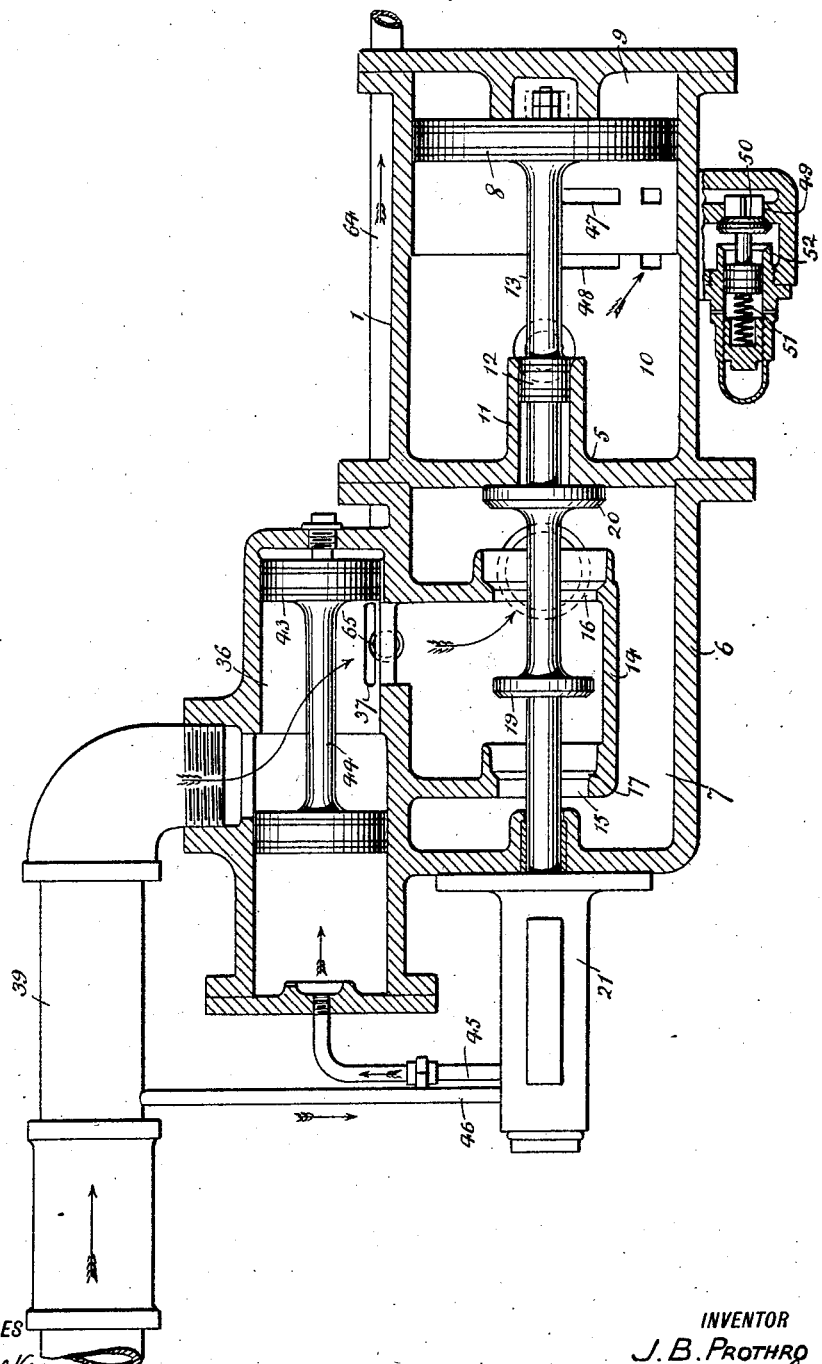

Patented Aug. 3, 1926.

1,595,024

UNITED STATES PATENT OFFICE.

JAMES B. PROTHRO, OF EL PASO, TEXAS.

LOCOMOTIVE DRIFTING VALVE.

Application filed June 27, 1924. Serial No. 722,801.

This invention relates to locomotive drifting valves, an object of the invention being to provide a valve, simple in design and construction, which will require the minimum of adjustment and repair and which automatically relieves itself of condensation so that it cannot freeze up.

A further object is to provide a valve of this character that automatically opens and admits a flow of steam to the locomotive valve chambers and cylinders and also to locomotive exhaust passages when the engine throttle is closed and the engine commences drifting so that if there is any intake of gases through the nozzle it will be steam instead of air and the gases of combustion.

A further object is to provide a mechanism of this character which automatically maintains the drifting pressure at approximately 8 lbs. per square inch for any and all rates of speed while the engine is drifting.

A further object is to provide a mechanism of this character which automatically closes as engine comes to a stop and remains closed until the engine again commences drifting.

A further object is to provide a drifting valve which does not open when the engine throttle is closed unless the engine is drifting as, for example, in making water tank, coal chute and station stops.

The primary object of the invention is, however, to provide a drifting valve which in compliance with the need of the locomotive will maintain the predetermined drifting pressure at the same pressure for any and all speeds with a minimum of variation therefrom.

With these and other objects in view, the invention consists in certain novel features of construction and combinations and arrangements of parts, which will be more fully hereinafter described and pointed out in the claims.

In the accompanying drawings—

Figure 1 is a view in elevation more or less diagrammatically illustrating my improved drifting valve in connection with a locomotive and showing the arrangement of pipes connecting the same with parts of the locomotive;

Figure 2 is a fragmentary view in cross section on the line 2—2 of Figure 1;

Figure 3 is a view in longitudinal and vertical section through my improved drifting valve;

Figure 4 is a view in transverse section on the line 4—4 of Figure 3;

Figure 5 is a view in horizontal longitudinal section through the drifting valve and the boiler admission valve cylinder communicating therewith and at one side thereof, the valve being shown in the position indicated in Figure 3 which is the position of the valve when it is under steam pressure;

Figure 6 is a view similar to Figure 3 showing the position of the valve when the engine is drifting;

Figure 7 is a view in transverse section on the line 7—7 of Figure 6;

Figure 8 is a view in transverse section on the line 8—8 of Figure 5;

Figure 9 is a view similar to Figure 5 showing the valve in position when the engine is drifting.

1 represents the cylindrical casing of my improved drifting valve, and I have illustrated in Figure 1 this drifting valve as being located at the upper front right-hand portion of the boiler 2 of locomotive A, although it is to be understood that the invention is not limited to the particular location of the drifting valve.

In Figure 1, I illustrate the locomotive A more or less diagrammatically and shall hereinafter refer to certain parts of said locomotive with which my improved valve mechanism is especially concerned, referring to said parts by the terms ordinarily employed without attempting to illustrate or describe such features in detail, as this is particularly well known in the art.

The casing 1 constitutes at one end a cylinder 3 having a head 4 enclosing one end thereof, and a dividing wall 5 at its other end separating the cylinder 3 from an extension 6 which forms a drifting pressure chamber 7.

The cylinder 3 is of two different internal diameters, the smaller internal diameter being located adjacent the right-hand extremity of Figures 3, 5, 6 and 9, and an equalizing piston head 8 fits this smaller internal diameter and divides the cylinder 3 into what I shall hereinafter term an equalizing cylinder 9 and a pressure retaining chamber 10. The retaining wall 5 is formed centrally with a pressure dividing cylinder 11 in which a small piston head 12 on the stem 13 of piston head 8 is mounted to move.

Within the drifting pressure chamber 7 a feed valve cage 14 is located and is provided at its opposite ends with ports 15 and 16 having valve seats 17 and 18 adapted to be closed by valves 19 and 20, respectively. These valves 19 and 20 are carried by the stem 13 above referred to and it will be noted that the valve 19 is appreciably smaller than the valve 20 with corresponding difference in the sizes of the ports and valve seats which they control for a purpose which will more fully hereinafter appear.

On the end of the extension 6 a casing 21 is secured and in this casing 21 a valve carrier 22 is mounted to move and is connected to the stem 13. It is of course to be understood that the several parts connected with the stem 13 may be constructed and coupled in any approved manner but I believe a simple construction is that illustrated in which the stem and several valves and pistons are hollow or have central openings so that a single rod 23 may be projected through all of the parts and securely clamped by nuts 24 on the ends of the rod. A removable plug 25 normally closes the end of casing 21 to facilitate access thereto when this plug is removed.

On the upper portion of the casing 21 a steam chest 26 is located and the steam ports 27, 28 and 29 therein are controlled by a slide valve 30. This slide valve 30 has a depending lug 31 which is located in a recess 32 in the carrier 22 and engaged by lugs 34 and 35 on the ends of the carrier to shift the slide valve, as will be hereinafter explained.

At one side of the drifting pressure chamber 7, I locate a boiler admission valve cylinder 36 which has ports 37 connecting the same with the valve cage 14. A steam supply pipe 39 communicates with the intermediate portion of the cylinder 36 and conveys live steam from the boiler to this cylinder.

In this pipe 39, I provide a spring-pressed valve 40 controlling drain outlets 41 so that when the pressure falls in this pipe this valve will automatically open and allow condensation to escape. It will be noted that the interior of the cylinder 36 is of two different diameters, the smaller diameter being at the right-hand end of Figure 5, and valve heads 42 and 43 are provided in the cylinder 36 fitting the respective internal diameters, and these heads 42 and 43 are rigidly connected by a rod 44 so that they operate as a single unit. The left-hand end of the cylinder 36 (referring to Figure 5) is connected by a pipe 45 with the port 28 in steam chest 26, and 46 represents a steam supply pipe which communicates with port 27. Port 29 constitutes an exhaust port or outlet from the steam chest.

The piston head 8 above referred to is located in the position shown in Figures 3 and 5 when the engine is operating normally under steam, and it will be noted that when the head 8 is in this position it is located between ports 47 and 48. These ports 47 and 48 together with a port 49 constitute a by-pass whereby pressures at both sides of the piston head are equalized. This port 49 is controlled by a spring-pressed valve 50, the pressure of which being such that it opens only when the pressure in the equalizing cylinder 9 is sufficient to overcome the spring 51, in which position the valve is seated against the end of its guide cylinder 52.

A steam pipe 53 connects the forward end of the equalizing cylinder 9 with the locomotive valve chamber 54. A tubular plug 55 is screwed into the retaining chamber 10 and supports a spring-pressed valve 56, the limit of the opening movement being controlled by a crossbar 57 and a spring 58 tending to open the valve to exhaust drain ports 58'. This valve is overcome by pressure within the chamber 10 to maintain the valve in closed position.

The stem 59 of the valve 56 is adapted to be engaged by a piston 60 mounted to move in a short cylinder 61 which is in open communication with a steam pipe 62. This steam pipe 62 connects with a pipe 63, and the ends of this pipe 63 are in open communication with the exhaust passages of both right and left-hand engines of the locomotive. A pipe 64 also connects the pipe 63 with a port 65 in the cage 14 of drifting pressure chamber 7. A pipe 66 communicates at one end with the drifting pressure chamber 7 through a port 67 and is connected at its other end to a pipe 68. This pipe 68 at its respective ends is connected to the right and left locomotive steam pipes 69.

It will be noted that I construct the boiler pressure admission valve 42, 43 as a separate unit from the drifting pressure feed valve 19, 20, and construct the drifting pressure feed valve so that after it leaves its seat it is a floating valve with no contact with the walls of its cage. The object of this design and construction is so that the bearings which carry the drifting pressure feed valve in opening and closing movements, move only under the drifting pressure (8 lbs. per square inch). This, to reduce to the minimum the power required to move the drifting pressure feed valve in opening and closing movements, and the variation of valve chamber pressure required to produce that power.

The operation is as follows:

Assuming the locomotive to be operating under steam, the position of the parts of my invention will be as indicated in Figures 3 and 5. When in this position valve chamber pressure passes up through pipe 53 and through port 47 holding valve 50, and passing through the port 48 into the pressure retaining chamber so that the pressure is maintained equal at both sides of the piston head 8.

When the throttle is closed and the engine is drifting, the parts are caused to move to the positions indicated in Figures 6 and 9, and this shifting of position is performed as follows: When the throttle is closed and the engine begins to drift, the rapid reduction of locomotive valve chamber pressure brings about the same reduction of pressure in the equalizing cylinder 9 through the pipe 53 and through the by-pass ports 47 and 48 until the pressure is reduced to 15 lbs. per square inch at both sides of the piston head 8. At this time the spring valve 50 will move to close the port 49.

A further reduction of pressure in the equalizing cylinder 9 will cause the head 8 to move to the right as indicated in Figures 5 and 9 due to the fact that steam at 15 lbs. to the square inch is trapped in the pressure retaining chamber 10. This movement of the head 8 causes the valves 20 and 19 to move to full open position and also causes the carrier 22 to engage the slide valve 30 and shift the same so as to uncover port 28. Live steam then from pipe 46 flows directly through pipe 45 into one end of the cylinder 36 and forces the piston heads 42 and 43 to the extreme right.

In this position live steam from pipe 39 is in open communication with the cage 14 and the drifting pressure chamber 7 through the ports 37. The live steam entering the cage 14 passes out through the port 65, pipe 64 and pipe 63 to the right and left locomotive exhaust passages. Also steam at boiler pressure passes from the steam pipe 63, through steam pipe 62 into the lower end of the vent valve cylinder 55 where it comes in contact with the piston 60, and the latter engaging the stem 59 elevates the valve 56. The steam pressure within the pressure retaining chamber 10 is now vented through the ports 58'.

Also steam at boiler pressure passes out of the chamber 7, through pipe 66 and pipe 68 to the right and left locomotive steam pipes. Valve chamber pressure will now rapidly build to drifting pressure. Next step is to maintain the drifting pressure. This is accomplished as follows: When the valve chamber pressure has built up to the predetermined drifting pressure (8 lbs. per square inch) the force exerted against the front face of equalizing piston head 8 by locomotive valve chamber pressure at 8 lbs. per square inch, equals the opposing constant force exerted by boiler pressure at 200 lbs. per square inch, in the direction of the differential between drifting pressure feed valve heads 19 and 20. An increase of locomotive valve chamber pressure of less than 1 lb. per square inch above the drifting pressure, produces a force against the front face of equalizing piston head 8 sufficiently greater than the opposing constant force produced by boiler pressure at 200 lbs. per square inch and the resistance of friction, that drifting feed valves 19 and 20 are moved to close.

Conversely, a decrease of locomotive valve chamber pressure of less than 1 lb. per square inch below the drifting pressure, produces a force against the front face of equalizing piston 8 sufficiently less than the opposing constant force produced by boiler pressure and the resistance of friction, that drifting pressure feed valves 19 and 20 are moved to open. Thus the predetermined drifting pressure is maintained at approximately 8 lbs. per square inch for any and all speeds while engine is drifting. Also a flow of steam is maintained to locomotive exhaust passages while engine is drifting.

When the engine slows down as it approaches a stop, less steam is required to maintain the drifting pressure, and as less steam is required, the locomotive valve chamber pressure builds up. When valve chamber pressure builds up to less than 1 lb. per square inch above drifting pressure, it produces a force against the front face of equalizing piston head 8 sufficiently greater than the opposing constant force produced by boiler pressure, at 200 lbs. per square inch and the resistance of friction, that drifting pressure feed valves 19 and 20 are moved to close. This closing movement continues in proportion as speed is reduced, until just before engine stops the slide valve carrier 22 comes into contact with the slide valve lug 31.

As the engine comes to a full stop the valve 30 is moved to close the steam port 28 to steam pressure and bringing it into communication with the exhaust port 29. Steam is now exhausted out of the cylinder 36 through the pipe 45 and ports 28, 29 so that the boiler pressure admission valves 42 and 43 are moved back to the limit of their backward travel from the pressure of steam from pipe 39, when the parts are in position for starting the engine by a full head of steam.

I would also call attention to the automatic opening of the drifting valve 19, 20 when the throttle is closed and engine commences drifting. Inherent in its operating principle this drifting valve has two separate self-starting forces: the first of these is fully and accurately described above, but if the by-pass pressure retaining mechanism should become so defective that the first or normal self-starting force should fail, then a moment later the second of these self-starting forces would come into action when locomotive valve chamber pressure is reduced below atmospheric pressure then atmospheric pressure entering through vent valve vent openings and through pressure retaining chamber and acting against the back face of equalizing piston produces a force sufficient to operate, and because of this reserve and surplus of self-starting forces makes this drifting valve almost immune to failure.

While I have illustrated what I believe to be a preferred embodiment of my invention it is obvious that various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. The combination with a locomotive of a drifting valve mechanism, comprising a casing, a piston head in the casing dividing the same into a pressure retaining chamber and an equalizing cylinder, said casing having a by-pass connecting the chamber and cylinder when the piston head is in normal position, a spring-pressed valve in the by-pass and caused to open by pressure within the equalizing cylinder, an extension on the casing forming a drifting pressure chamber, a valve cage in the last-mentioned chamber, a pair of valves controlling ports in the cage and fixed to move with the piston head, a boiler admission valve cylinder communicating with the pressure chamber, a valve in said cylinder, a steam valve operated by the movement of the piston head to control the position of the valve in the pressure cylinder, and means for directing steam from the engine valve chamber to the equalizing cylinder.

2. The combination with a locomotive of a drifting valve mechanism, comprising a casing, a piston head in the casing dividing the same into a pressure retaining chamber and an equalizing cylinder, said casing having a by-pass connecting the chamber and cylinder when the piston head is in normal position, a spring-pressed valve in the by-pass and caused to open by pressure within the equalizing cylinder, an extension on the casing forming a drifting pressure chamber, a valve cage in the last-mentioned chamber, a pair of valves controlling ports in the cage and fixed to move with the piston head, a boiler admission valve cylinder communicating with the pressure chamber, a valve in said cylinder, and a steam valve operated by the movement of the piston head to control the position of the valve in the pressure cylinder, said piston head, cage valves, and steam valve operating means constituting a single movable unit.

3. The combination with a locomotive of a drifting valve mechanism, comprising a casing, a piston head in the casing dividing the same into a pressure retaining chamber and an equalizing cylinder, said casing having a by-pass connecting the chamber and cylinder when the piston head is in normal position, a spring-pressed valve in the by-pass and caused to open by pressure within the equalizing cylinder, an extension on the casing forming a drifting pressure chamber, a valve cage in the last-mentioned chamber, a pair of valves controlling ports in the cage and fixed to move with the piston head, a boiler admission valve cylinder communicating with the pressure chamber, a valve in said cylinder, a steam valve operated by the movement of the piston head to control the position of the valve in the pressure cylinder, said piston head, cage valves, and steam valve operating means constituting a single movable unit, a pipe connecting the pressure chamber with the engine valve chambers, and a pipe connecting the interior of the cage with the exhaust of the engine.

4. The combination with a locomotive of a drifting valve mechanism, comprising a casing, a piston head in the casing dividing the same into a pressure retaining chamber and an equalizing cylinder, said casing having a by-pass connecting the chamber and cylinder when the piston head is in normal position, a spring-pressed valve in the by-pass and caused to open by pressure within the equalizing cylinder, a steam pipe connecting the valve chambers of the engine with the equalizing cylinder, and valve mechanism operated by the movement of the piston head to control the flow of steam to the engine cylinder at a predetermined pressure for all speeds when the throttle is closed and the engine is drifting.

JAMES B. PROTHRO.